Figure 1:
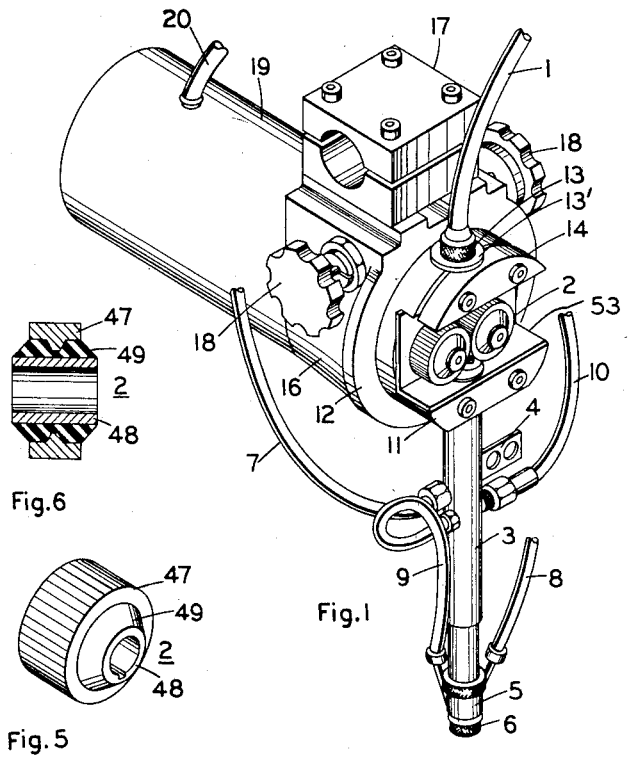

Sept. 29, 1959  J. T. CATLETT  2,906,913
ARC WELDING HEAD
Filed June 4, 1956

Inventor:
James T. Catlett
by Richard E. Horley
His Attorney

United States Patent Office 2,906,913
Patented Sept. 29, 1959

2,906,913

ARC WELDING HEAD

James T. Catlett, York, Pa., assignor, by mesne assignments, to Air Reduction Company, Incorporated, New York, N.Y., a corporation of New York Application June 4, 1956, Serial No. 589,220

12 Claims. (Cl. 314—68)

My invention relates to a wire feeding device which is particularly suited for use as an arc welding head by means of which a fusible electrode is fed to the work as it is consumed and deposited in the weld by an arc established between it and the work.

Various arrangements have heretofore been proposed for feeding an electrode to the work in accordance with its consumption in the arc. When using conventional welding procedures, the electrode feeding rate is comparatively slow and means are provided for controlling the direction of electrode feed toward and from the work in order to strike and maintain a welding arc in accordance with an electrical characteristic of the welding circuit, usually the voltage of the welding arc. In these conventional procedures, the size of the electrode is usually greater than one-eighth of an inch in diameter and the magnitude of the welding current employed produces an arc whose voltage varies with its length. More recently, a new welding procedure has been developed in which electrodes less than one-eighth of an inch in diameter are used so as to provide, with the usually available arc welding current sources, a current density in the electrode which is of the order of 40,000 to 280,000 amperes per square inch. At these high-current densities, the electrode is consumed at a very rapid rate and must be fed at speeds of from 100 to 1000 inches per minute. These high electrode feed speeds are necessary because of the reduction in electrode size which is required in order to obtain the high-current densities employed in this welding procedure. Usually, the electrode size is from .020 to one-eighth of an inch in diameter. In this method of welding, it is not necessary to reverse the direction of electrode feed since the arc is struck when the electrode engages the work and when the welding current and electrode feeding rate are properly matched, the arc becomes self-regulating. If the welding current source has a rising volt-ampere characteristic corresponding to that of the arc, the length of the welding arc is also maintained constant as pointed out in U.S. Letters Patent 2,680,181, Roger W. Tuthill and Alanson U. Welch, Jr., June 1, 1954.

An arc welding head suitable for feeding electrodes of small size at these high rates of speed must embody an arrangement of smoothly running parts which maintains a positive drive between the feed rolls of the head and the electrodes engaged thereby. It must also provide for an adjustment of parts to accommodate electrodes of different sizes. Furthermore, the feed rolls must have wear-resistant electrode engaging surfaces and be mounted in the welding head in a manner to be readily replaceable therein. The welding head should also embody a cross-seam adjustment of the direction of electrode feed. This adjustment should be firm and resistant to displacement due to any vibration of the rapidly moving parts of the welding head. It should also be operable while the welding head is feeding an electrode during a welding operation.

It is an object of my invention to provide a wire feeding device capable of feeding small size wires at high rates of speed and suitable for use as an arc welding head for feeding, without adjustment of its parts, electrodes which vary in size within a given range of sizes.

It is also an object of my invention to provide an arc welding head in which the feed rolls thereof are spaced from one another by a fixed distance and in themselves embody a pressure mechanism for securing a desired electrode pressure for a range in electrode sizes which is determined by the gaps between pairs of feed rolls which are interchangeably mounted in the welding head and selected in accordance with the sizes of electrodes to be fed by the welding head.

It is another object of my invention to provide an arc welding head in which the feed rolls have rims and hubs of durable material between which there is an elastic material which is deformed to provide the desired electrode feeding pressure on the electrode.

It is also an object of my invention to provide an arc welding head in which the operating life of feed rolls with cylindrical electrode engaging surfaces is doubled by endwise reversibly mounting them on their drive shafts relative to a guide which directs the welding electrode to one side of the center of their cylindrical electrode engaging surfaces.

It is a further object of my invention to provide in an arc welding head an improved elastic mounted antibacklash adjusting means for positioning and frictionally holding in adjusting position a member which supports the feed rolls and the electrode guides associated therewith for rotation about the driving gear which imparts rotation to the feed rolls so that the direction of electrode feed in the plane of adjustment may be changed while the welding head is in operation.

Other objects of my invention will become apparent from the following description of one embodiment thereof illustrated in the accompanying drawing.

The above objects may be accomplished by propelling the electrode by means of deformable feed rolls which are spaced from one another less than the thickness of the electrode to be fed thereby. These feed rolls may comprise rim and hub portions formed of metal and between which there is an elastic material, such as rubber or an equivalent elastic material, which will permit deformation of the feed rolls when the electrode passes between them. These metal tired rubber feed rolls are detachably mounted on spindles which are spaced a predetermined distance from one another and the deformation of the feed rolls upon the passage of an electrode therebetween applies the desired driving pressure to the electrode. In a preferred arrangement, the elastic material is bonded to the hub of the feed roll and held by partial compression in frictional engagement with its rim through an interlocking tongue and groove construction which extends circumferentially thereof. In order to double the operating life of feed rolls having cylindrical electrode engaging surfaces, they are endwise reversibly mounted on their spindles so that two different areas of their electrode engaging surfaces may be presented to an electrode which is directed therebetween by electrode guides that position the electrode to one side of the centers of the electrode engaging surfaces of the feed rolls.

These feed rolls may be mounted on spindles which are the projecting end portions of a plurality of parallel shafts which are spaced from one another by a fixed distance and rotatably supported in bearings in a face plate which is supported for rotational adjustment in a gear housing forming part of the welding head. The gear housing also acts as a support for an electric feed motor having a drive shaft extending into the gear housing and on the end of which there is a driving gear. The face plate supports a gear reduction which is connected-between the driving gear on the motor shaft and the shafts whose ends project through the face plate and constitute spindles for the feed rolls. The arrangement is such that the face plate rotates about the axis of the motor shaft and the gear drive mounted thereon rotates about the driving gear on the motor shaft so that rotational adjustment may be imparted to the face plate while the gearing is operative for imparting rotation to the feed rolls to propel the electrode which they engage. The face plate is rotatably adjusted relative to the gear housing in which it is mounted by a transmission including an adjusting shaft which is held against endwise movement in the gear housing and supported therein for rotation by bushings of elastic material which are under compression and bias the elements of the transmission into tight engagement with one another, thus eliminating backlash between these elements and providing a frictional means for holding them in adjusted position.

Figure 7:
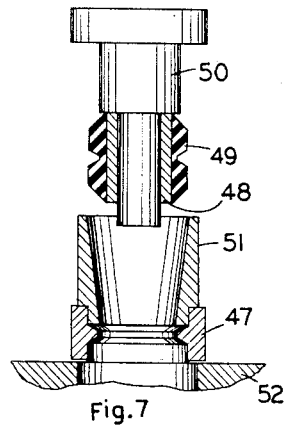
Figure 2:
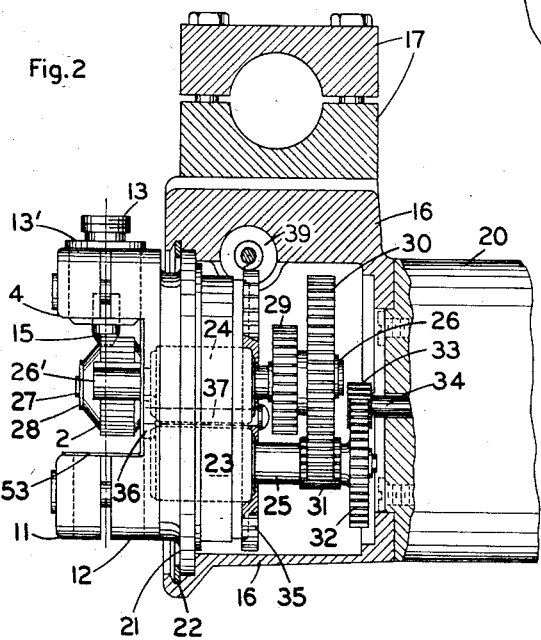
Figure 3:
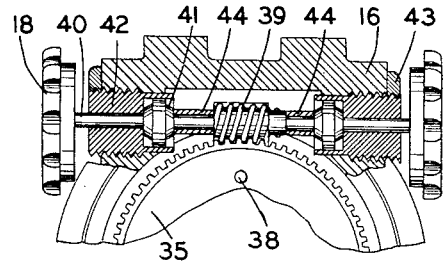
Figure 4:
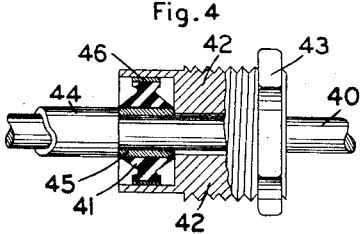

The characteristic features of my invention will be better understood from the following more complete description of one embodiment thereof in a welding head which is adapted for feeding a consumable metallic electrode when performing a gas-arc welding operation. Fig. 1 of this drawing is a perspective view of this welding head; Fig. 2 is a view, partly in section, showing the working parts of the electrode feeding mechanism thereof; Fig. 3 is a view, partly in section, showing the cross-seam adjusting means forming part of this welding head; Fig. 4 is an enlarged view showing in greater detail the elastic mounting for the adjusting shaft shown in Fig. 3; Figs. 5 and 6 are respectively perspective and cross-sectional views of the deformable feed rolls employed in the welding head; and Fig. 7 is a view, partly in section, showing one manner of assembling the elements of the feed rolls.

In the welding head shown in the drawing, an electrode supplied through an entrance hose 1 is propelled by a pair of deformable feed rolls 2 through a torch 3 by means of which current is supplied to the electrode and a shielding gas is supplied about its arcing terminal and the portions of the work rendered molten by the arc. Feed rolls 2 and their mounting constitute one feature of my invention which will be more fully described below. Welding current is supplied to the electrode through a terminal 4 which is conductably connected to the central member or head tube of the torch which terminates in a contact tip which is in frictional engagement with the electrode passing therethrough. This contact tip is enclosed by water-cooled nozzle 5 having a replaceable tip 6. Gas is supplied through hose 7 to the head tube from the lower end of which it is discharged about the contact tip and into the nozzle from which it flows through the nozzle tip about the arcing terminal of the electrode. The nozzle 5 is cooled by water supplied through a hose 8 and discharged through a hose 9 which in turn supplies the cooling water lengthwise of the head tube from which it is exhausted through a hose 10.

Torch 3 is held in a clamp 11 which is attached to the lower front portion of the face plate 12 of the welding head, and the entrance hose 1 is attached to the welding head by a threaded coupling 13, one member of which is a nut swivel mounted on the end of hose 1 and the other member of which is a nipple forming part of a guide bushing 13' which is held by a clamp 14 on the upper front portion of the face plate. The feed rolls 2 are positioned between these clamps 11 and 14 and bushing 13' is provided at its lower end with a wire guide 15 which directs the electrode between the feed rolls and to one side of the center of their cylindrical electrode engaging surfaces as shown by the dot and dash line in Fig. 2. The electrode upon leaving the feed rolls enters a wire guide in the upper end of the torch through which it is directed to the work.

The face plate 12 of the welding head is mounted for rotational adjustment on a gear housing 16 which serves as a mounting member for the several parts of the welding head. This gear housing has a pair of pillow blocks 17 which are symmetrical in shape and in their bolted attachment to two ribs extending lengthwise of the top outer surface of gear housing 16. They are provided with complementary cavities which face one another and are adapted to be held in clamping engagement with a support member for the welding head. These pillow blocks constitute means for clamping the welding head to a mounting post which may be either parallel or at 90° to the feed rolls' axes. Preferably, the arrangement is such as to position the welding head so that the axes of rotation of the feed rolls are at right angles to the support post as shown in Fig. 1. This permits torch 3 of the welding head to be clamped perpendicular to the work or tipped forward or backward with respect to the direction of travel of the work relative to the welding head. It also enables the rotatably mounted face plate 12 of the welding head to constitute a cross-seam adjustment for the welding electrode which is fed through torch 3. This cross-seam adjustment is accomplished by the rotation of hand wheels 18 which are mounted on the ends of an adjusting shaft forming part of a transmission for rotating the face plate relative to the gear housing. The gear housing also supports, on its back side, an electric feed motor 19 to which electric current is supplied through a cable 20.

As shown in Fig. 2 of the drawing, face plate 12 is provided with a circular flange 21, the edge and back side of which are seated in a groove of corresponding size formed in the face portion of gear housing 16. It is held in position by means of a removable snap ring 22 which engages the front side of flange 21 and is seated in a snap-ring slot also formed in the face portion of the gear housing 16. The face plate may be removed from the gear housing by removing the snap ring from its slot.

Face plate 12 provides a support for three bearings 23 and 24 which rotatably support three shafts 25 and 26. Bearings 24, one of which is behind the one shown in Fig. 2, constitute supports for feed roll shafts 26, one of which is also behind the one shown in Fig. 2. These shafts extend through the face plate and provide feed roll spindles 26' on which feed rolls 2 are mounted. These feed rolls fit over the ends of the spindles with which they make a driving engagement by being keyed thereto. The feed rolls are held in place on the spindles by means of screws 27 which are threaded into the ends of spindles 26', and have heads which engage washers 28 which bear against the outer end portions of the feed rolls.

The feed roll shafts 26 are rotated by a pair of meshing gears 29, one of which is behind the other as shown in Fig. 2, and each of which is key connected to its respective shaft. One of these feed roll shafts is driven by a gear 30 which is keyed thereto and meshes with a driving gear 31 mounted for rotation on jack shaft 25. This gear 31 is driven by a gear 32 which is also free to rotate on shaft 25 but which is mechanically connected with gear 31 through a driving connection between the abutting hub portion of these gears. Gear 32 is driven by a gear 33 which is mounted on the end of the driving shaft 34 of feed motor 20. Feed motor 20 is positioned in gear housing 16 by interfitting parts so as to position its drive shaft 34 and driving gear 33 for rotation about an axis corresponding to the axis of rotation of face plate 12 in gear housing 16. Consequently, when the face plate is rotatably adjusted, gear 32 mounted thereon rotates about gear 33 and this adjustment may be made while the gear train is in operation for transmitting power from the feed motor shaft to the feed roll spindles. The gear reduction may be altered by changing the relative sizes of gears 30 and 31. Thus, one pair of gears 30 and 31 may be employed for one speed range of the feed rolls and another pair of gears 30 and 31 may be employed for a higher or lower speed range.

Bearings 23 and 24 are held in place in face plate 12 by a gear 35 and washer 36 which are respectively held in clamping engagement with the inner and outer ends of the bearings by means of a bolt 37 which passes through gear 35 and face plate 12 and has a head portion which engages the outer surface of gear 35 and an opposite end portion which makes a threaded engagement with washer 36. The center line of gear 35 coincides with the center line of face plate 12 and of motor drive shaft 34. It is held against rotation on the face plate by a dowel-headed screw 38 shown in Fig. 3. Gear 35 may be a worm wheel but is preferably a special gear of the spur type with teeth cut at the lead angle of a worm 39 by means of which rotation is imparted to it for rotatably adjusting face plate 12 in gear housing 16.

Worm 39 is pin attached to an adjusting shaft 40 which is supported by elastic mounts 41 carried by bushings 42 which are threaded into opposed openings therefor in the gear housing. These bushings are held in adjusted position in the gear housing by lock nuts 43. Tubular spacing members 44 are positioned on shaft 40 between the ends of worms 39 and the inner ends of elastic mounts 41 so that by adjusting bushings 42 relative to one another worm 39 and its adjusting shaft 40 may be held against endwise movement in the gear housing. As shown in Fig. 4, elastic mounts 41 have a body portion formed of rubber or a material having the properties of rubber, which may be bonded to inner and outer sleeves 45 and 46 thereof which are respectively in engagement with the adjusting shaft 40 and the inner wall of the cupped openings in the inner ends of bushings 42. Sufficient clearance is left between adjusting shaft 40 and the passageways in bushings 42 for this shaft so that gears 39 and 35 may be assembled with the elastic mountings 41 in compression and forcing worm 39 into firm engagement with gear 35. With this interference fit between gears 35 and 39 forming part of the transmission by means of which the face plate is adjusted in its gear housing, backlash is eliminated and the parts are held in frictional engagement with one another to maintain them in the position to which they are moved by rotation of adjusting shaft 40 by hand wheels 18 mounted on the outer ends thereof.

The physical structure of feed rolls 2 is shown in Figs. 5 and 6. They have rigid rims 47 and rigid hubs 48 between which there is an elastic material 49 which is preferably in partial compression initially and will yield to radial pressure exerted on the feed rolls by an electrode passing between a spaced pair of these feed rolls. The elastic material 49 is preferably bonded to sleeve 48 and frictionally engages rim 47 along an interlocking connection which extends circumferentially thereof. This interlocking connection may be formed by an internal circumferential rib portion of the rim and a groove formed in the elastic material 49 to accommodate this rib. The sleeve of elastic material 49 may be rubber or a material having the properties of rubber. If rubber is used, it may be natural rubber, reclaimed rubber, vulcanized rubber, or synthetic rubber. In any case, it must have sufficient elasticity to permit a substantial deformation of the feed roll when pressure is applied thereto when its rim engages an electrode fed between a pair of feed rolls.

Pairs of different size feed rolls are employed for different ranges of electrode sizes, and the sizes of the feed rolls are such relative to their spacing that the gap between them is less than the size of the electrode which they are to feed so that the elastic material in the feed rolls will be further compressed by the displacement of a feed roll rim relative to its hub and exert the desired pressure on the electrodes in engagement therewith. For example, a pair of feed rolls of one size may be employed for feeding electrodes having a cross-section of from .020 to 5/64 of an inch in diameter and another pair of electrode feed rolls may be employed for feeding electrodes having a cross section of from 1/16 to 1/8 of an inch in diameter.

A feed roll having the structure above described may be fabricated by bonding the elastic material to the hub of the feed roll and forming in the elastic material the groove which accommodates the internal rib on the rim of the feed roll. This subassembly may then be mounted on a plunger 50 by which it is forced into rim 47 through a guide member 51 having a tapered internal opening which compresses the elastic material on the hub during its passage therethrough by an amount enabling it to pass the internal rib of the rim. This guide member 51 may be supported as shown on the upper edge of the feed roll rim 47 which is in turn supported at its bottom edge on a platen 52 having an opening in alignment with the opening therein through which the end of the plunger may pass during the assembly operation. Platen 52 and plunger 50 may be parts of an arborpress and the movement of the parts into assembled relationship may be facilitated by using water or castor oil as a lubricant between the parts.

Rubber cushioned feed rolls having the construction above described effectively insulate the electrode from the driving mechanism of the welding head by means of which they are rotated. Hose 1 and its coupling 13 are insulated from the welding head by forming guide bushing 13' of an insulated material. A folded strip of insulated material 53 may be inserted behind the feed rolls and between the feed rolls and the torch clamp so that a misguided electrode or the scale and metal particles which accumulate during an electrode feeding operation will not form a conductive connection between the electrode and the face plate of the welding head. For safety purposes, the welding head should be grounded through its pillow block mounting 17.

It is, of course, apparent that the feed roll structure above described may be variously modified without departing from the spirit and scope of my invention. Various arrangements other than that described will occur to those skilled in the art for providing feed rolls having rims and hubs of durable material between which there is sandwiched an elastic material which is deformed during an electrode feeding operation in order to secure the desired electrode feeding pressure on the electrode. The elastic material is preferably held in compression between the hub and rim members of the feed roll since it has been found that if this elastic material is bonded to both the hub and rim by a vulcanizing operation, the elastic material will be in tension and the added tension occurring when the feed roll is in service will cause the rim to become separated from the elastic material. By bonding the elastic material to one of the members, and placing it in pressure engagement with the other of these members, this difficulty is not encountered. Furthermore, it is desirable to form some sort of interlocking engagement between the feed roll member which is not bonded to the elastic material for otherwise this member will "walk" off of its elastic mounting due to the eccentric loading applied to the feed roll when it is in driving engagement with an electrode. It is also obvious that only one of a pair of feed rolls employed for feeding an electrode need have the structure above described since only one of a pair of feed rolls need be deformable in accordance with my invention in order to secure the desired pressure engagement between the feed rolls and the electrode fed thereby. The means for supporting the feed roll spindles in fixed position relative to one another and for imparting rotation thereto may be variously modified without departing from my invention. Likewise, the elastic mounted adjusting shaft for producing an interference fit between the gears of a transmission by which the face plate of a welding head may be rotatively adjusted on its support may also be variously modified without departing from the spirit and scope of my invention.

Thus, while I have shown and described but one embodiment of my invention, it will be understood that I intend to cover by the appended claims, all modifications of my invention which fall within the true spirit and scope thereof.

What I claim as new and desire to secure by Letters Patent of the United States is:

1. A wire feeding device comprising a pair of parallel shafts spaced from one another by a fixed distance, means for rotating at least one of said shafts, and a pair of feed rolls mounted on said shafts and spaced from one another less than the thickness of a wire to be fed thereby, at least one of said feed rolls having a rigid rim and hub between which there is an elastic material which will yield to radial pressures exerted on said feed roll by said wire passing between said feed rolls, said material being bonded to said hub and in frictional engagement with said rim.

2. A wire feeding device comprising a pair of parallel shafts spaced from one another by a fixed distance, means for rotating at least one of said shafts, and a pair of feed rolls mounted on said shafts and spaced from one another less than the thickness of a wire to be fed thereby, at least one of said feed rolls having a rigid rim and hub between which there is a partly compressed elastic material which will be further compressed and yield to radial pressures exerted on said feed roll by said wire passing between said feed rolls without interrupting its pressure engagement with said rim circumferentially thereof, said elastic material being bonded to said hub for rotation therewith and with said rim against which it is compressed.

3. A wire feeding device comprising a pair of parallel shafts spaced from one another by a fixed distance, means for rotating at least one of said shafts, and a pair of feed rolls mounted on said shafts and spaced from one another less than the thickness of a wire to be fed thereby, at least one of said feed rolls having rigid rim and hub members between which there is an elastic material which will yield to radial pressure exerted on said feed roll by a wire passing between said feed rolls, said elastic material being bonded to one of said members and frictionally engaging the other of said members along an interlocking connection which extends circumferentially thereof.

4. A wire feeding device comprising a pair of parallel shafts spaced from one another by a fixed distance, means for rotating at least one of said shafts, and a pair of feed rolls mounted on said shafts and spaced from one another less than the thickness of a wire to be fed thereby, at least one of said feed rolls having rigid rim and hub members between which there is a partly compressed elastic material which will yield to radial pressure exerted on said feed roll by a wire passing between said feed rolls, said elastic material being bonded to one of said members and frictionally engaging the other of said members along an interlocking connection which extends circumferentially thereof.

5. An arc welding head comprising a pair of parallel shafts spaced from one another by a fixed distance, means for rotating at least one of said shafts, and a pair of feed rolls having hubs respectively mounted on said shafts and rims spaced from one another less than the thickness of an electrode to be fed thereby, said feed rolls each having a rigid metallic rim connected to a rigid metallic hub by an elastic material which is bonded to said hub and is compressed between said rim and said hub by an amount which will maintain it in pressure engagement with said rim circumferentially thereof when it is further compressed by an electrode passing between said feed rolls.

6. An arc welding head comprising a pair of parallel shafts spaced from one another by a fixed distance, means for rotating at least one of said shafts, and a pair of feed rolls mounted on said shafts and spaced from one another less than the thickness of an electrode to be fed thereby, at least one of said feed rolls having rigid rim and hub members between which there is a partly compressed elastic material which will yield to radial pressure exerted on said feed roll by an electrode passing between said feed rolls, said elastic material being bonded to one of said members and frictionally engaging the other of said members along an interlocking connection which extends circumferentially thereof.

7. An arc welding head comprising a pair of parallel shafts spaced from one another by a fixed distance, means for rotating at least one of said shafts, and a pair of feed rolls having metallic hubs respectively mounted on said shafts and metallic rims spaced from one another less than the thickness of an electrode to be fed thereby, each of said feed rolls having between its hub and rim a sleeve of elastic material which is bonded to its hub and held in frictional engagement with its rim through an interlocking tongue and groove construction extending circumferentially thereof.

8. Arc welding apparatus comprising a face plate, electrode feed rolls mounted on said face plate, a support, a drive shaft rotatably mounted in said support, means for mounting said face plate on said support for rotation about the axis of said drive shaft, means for imparting rotation from said drive shaft to said feed rolls throughout the rotational movement of said face plate on its said support, and means for rotating said face plate relative to said support, said means including a transmission having rotatable elements one of which is attached to said face plate and the other of which is attached to an adjusting shaft which is held against endwise movement in said support and which is mounted for rotation therein by bushings of elastic material which are under compression and bias said elements of said transmission into tight engagement with one another.

9. Arc welding apparatus comprising a face plate, a support for said face plate, a drive shaft rotatably mounted in said support, a pair of driven shafts rotatably supported on said face plate, a pair of feed rolls mounted on said shafts, means mounted on said face plate for directing an electrode between said feed rolls, means for rotating said face plate about the axis of said drive shaft, a gear train connecting said driven shafts with said drive shaft throughout the rotational movement of said face plate, and means for rotating said face plate relative to said support, said means including a transmission having rotatable elements one of which is attached to said face plate and the other of which is attached to an adjusting shaft which is held against endwise movement in said support and which is mounted for rotation therein by bushings of elastic material which are under compression and bias the elements of said transmission into tight engagement with one another.

10. An arc welding head comprising a hollow gear housing having spaced end walls, a drive shaft projecting into said housing and mounted for rotation in one of said end walls of said housing, a gear on said drive shaft and within said housing, a face plate mounted in the other of said end walls of said housing for rotation about the axis of said drive shaft, a plurality of parallel shafts spaced from one another by fixed distances and supported by bearings in said face plate, two of said shafts extending through said face plate to form feed roll spindles projecting from the front surface of said face plate, a gear train mounted on the ends of said shafts which project from the back surface of said face plate, said gear train having an input member in engagement with and rotatable about said gear on said drive shaft and having output members imparting rotation to said shafts which extend through said face plate, means for rotating said face plate relative to said gear housing, said means including a transmission having rotatable elements one of which is attached to said face plate and the other of which is attached to an adjusting shaft which is held against endwise movement in said gear housing and supported for rotation therein, means exterior to said gear housing and attached to said adjusting shaft for imparting rotation thereto, a pair of electrode feed rolls mounted on said spindles for rotation therewith, and means mounted on the front surface of said face plate for directing an electrode between said feed rolls.

11. An arc welding head comprising a hollow gear housing having spaced end walls, a drive shaft projecting into said housing and mounted for rotation in one of said end walls of said housing, a gear on said drive shaft and within said housing, a face plate mounted in the other of said end walls of said housing for rotation about the axis of said drive shaft, a plurality of parallel shafts spaced from one another by fixed distances and supported by bearings in said face plate, two of said shafts extending through said face plate to form feed roll spindles projecting from the front surface of said face plate, a gear train mounted on the ends of said shafts which project from the back surface of said face plate, said gear train having an input member in engagement with and rotatable about said gear on said drive shaft and having output members imparting rotation to said shafts which extend through said face plate, means for rotating said face plate relative to said gear housing, said means including a transmission having rotatable elements one of which is attached to said face plate and the other of which is attached to an adjusting shaft which is held against endwise movement in said gear housing and supported for rotation therein by bushings of elastic material which are under compression and bias the elements of said transmission into tight engagement with one another, means exterior to said gear housing and attached to said adjusting shaft for imparting rotation thereto, a pair of electrode feed rolls mounted on said spindles for rotation therewith, and means mounted on the front surface of said face plate for directing an electrode between said feed rolls.

12. An arc welding head comprising a hollow gear housing having spaced end walls, a drive shaft projecting into said housing and mounted for rotation in one of said end walls of said housing, a gear on said drive shaft and within said housing, a face plate mounted in the other of said end walls of said housing for rotation about the axis of said drive shaft, a plurality of parallel shafts spaced from one another by fixed distances and supported by bearings in said face plate, two of said shafts extending through said face plate to form feed roll spindles projecting from the front surface of said face plate, a gear train mounted on the ends of said shafts which project from the back surface of said face plate, said gear train having an input member in engagement with and rotatable about said gear on said drive shaft and having output members imparting rotation to said shafts which extend through said face plate, means for rotating said face plate relative to said gear housing, said means including a transmission having rotatable elements one of which is attached to said face plate and the other of which is attached to an adjusting shaft which is held against endwise movement in said gear housing and supported for rotation therein by bushings of elastic material which are under compression and bias the elements of said transmission into tight engagement with one another, means exterior to said gear housing and attached to said adjusting shaft for imparting rotation thereto, a pair of feed rolls having metallic hubs respectively mounted on said spindles for rotation therewith and metallic rims spaced from one another less than the thickness of an electrode to be fed thereby, each of said feed rolls having between its hub and rim a sleeve of partly compressed elastic material which is bonded to its hub and held in frictional engagement with its rim through an interlocking tongue and groove construction extending circumferentially thereof, and means mounted on the front surface of said face plate for directing an electrode between said feed rolls and to one side of the center of their electrode engaging surfaces.

References Cited in the file of this patent

UNITED STATES PATENTS

| | | |
|---|---|---|
| 2,170,673 | Anderson | Aug. 22, 1939 |
| 2,272,158 | Anderson | Feb. 3, 1942 |
| 2,696,907 | Fisk | Dec. 14, 1954 |